United States Patent
Shiraki et al.

(12) 
(10) Patent No.: US 6,465,927 B2
(45) Date of Patent: Oct. 15, 2002

(54) MINIATURE ELECTRIC MOTOR

(75) Inventors: Kenji Shiraki; Hideki Itaya, both of Matsudo (JP)

(73) Assignee: Mabuchi Motor Co., Ltd., Chiba-Ken (JP)

( * ) Notice: Subject to any disclaimer, the term of this patent is extended or adjusted under 35 U.S.C. 154(b) by 0 days.

(21) Appl. No.: 09/983,123

(22) Filed: Oct. 23, 2001

(65) Prior Publication Data

US 2002/0050759 A1 May 2, 2002

(30) Foreign Application Priority Data

Oct. 31, 2000 (JP) .......................... 2000-333748

(51) Int. Cl.[7] .......................... H02K 5/14; H02K 13/00; H02K 23/00
(52) U.S. Cl. .......................... 310/239; 310/89; 310/71; 310/240; 310/154
(58) Field of Search .......................... 310/239, 71, 89, 310/240, 290, 242, 154, 51

(56) References Cited

U.S. PATENT DOCUMENTS

| | | | |
|---|---|---|---|
| 3,546,504 A | | 12/1970 | Janssen et al. |
| 4,086,510 A | * | 4/1978 | Watanabe ............... 310/24 |
| 4,092,581 A | * | 5/1978 | Ascoli .................... 320/2 |
| 5,373,208 A | * | 12/1994 | Ichimura ................ 310/154 |
| 5,434,460 A | * | 7/1995 | Mabuchi ................ 310/71 |
| 5,497,039 A | * | 3/1996 | Blaettner ............... 310/51 |
| 5,619,084 A | * | 4/1997 | Lau ....................... 310/154 |
| 5,969,447 A | | 10/1999 | Periyathambi et al. |
| 6,129,176 A | | 10/2000 | Hunsberger et al. |
| 6,179,894 B1 | * | 1/2001 | Gay ....................... 75/230 |
| 6,218,760 B1 | * | 4/2001 | Sakuragi ................ 310/254 |
| 6,342,739 B1 | * | 1/2002 | Furua .................... 310/40 |
| 2001/0017495 A1 | * | 8/2001 | Sato ...................... 310/67 R |

FOREIGN PATENT DOCUMENTS

| | | | |
|---|---|---|---|
| DE | 197 33 223 | | 4/1999 |
| GB | 2 151 413 | | 7/1985 |
| GB | 2 194 392 | | 3/1998 |
| JP | 55-128473 | * | 9/1980 |
| JP | 6-17355 | | 3/1994 |
| JP | 6-17355 | * | 6/1994 |
| JP | 7-21085 | | 5/1995 |
| JP | 07-21085 | * | 5/1995 |
| JP | 9-140081 | | 5/1997 |
| JP | 09 322 468 | | 12/1997 |
| JP | 10-285865 | * | 10/1998 |

OTHER PUBLICATIONS

European Patent Office Search Report for Application No. 01 30 91 91 dated Feb. 11, 2002.

* cited by examiner

Primary Examiner—Nestor Ramirez
Assistant Examiner—I A Mohandesi
(74) Attorney, Agent, or Firm—Armstrong, Westerman & Hattori, LLP

(57) ABSTRACT

A miniature electric motor comprises a housing, a cover plate fitted in an opening portion of the housing, a stator fixed to an inner circumferential surface of the housing, a rotor supported rotatably to one and the other bearing portions mounted on the housing and the cover plate, respectively, the rotor being disposed in the housing, and a brush holder holding brushes slidingly engaging with a commutator of the rotor, the brush holder being mounted on the cover plate. A first projection is formed in the vicinity of a center of the brush holder, and the first projection is forcibly pressed at a predetermined pressure against the cover plate. According to the present invention, without using any vibration proof elastic member, it is possible to reduce a noise of the miniature motor and keep the motor quiet. This motor is used for driving an air conditioner of an automobile, or the like.

19 Claims, 7 Drawing Sheets

MINIATURE ELECTRIC MOTOR

BACKGROUND OF THE INVENTION

1. Field of the Invention

The present invention relates to a miniature electric motor. This motor is used for automotive electric equipment such as air conditioners of automobiles, audio visual equipment such as CD (compact disc) players, OA (office automation) equipment such as copying machines, optical precision equipment such as compact cameras, electric equipment for home use, toys or the like.

2. Description of the Related Art

A miniature electric motor is extensively used in various fields in addition to the above-specified equipment and is demanded to be quiet by reducing noise of motor.

FIG. 5 is a cross-sectional view of a conventional miniature electric motor. In the miniature electric motor 1, a stator 5 is mounted on an inner circumferential surface of a casing 4, having a housing 2 and a cover plate 3. A rotor 6 is disposed in the interior of the casing 4 and a rotary shaft 9 of the rotor 6 is rotatably supported by bearing portions 7 and 8 mounted on the casing 4. Brushes 11 are slidingly engaged with a commutator 10 of the rotor 6. The brushes 11 are held by a brush holder 12 mounted on the cover member 3.

In some cases, the thus constructed motor 1 is used for driving, for example, a damper of an air conditioner of an automobile. In these cases, the brushes 11 are brought into sliding contact with the commutator 10 when the motor 1 is driving, so that the brushes 11 are vibrated and a noise (a mechanical noise) is generated from the motor 1.

If a frequency of the motor noise is out of an auditory sensation area, the noise is not heard by the human ears. However, in the case in which the motor noise is a sound of the frequency within the auditory sensation area and is in particular a high frequency sound (for example, a sound having a frequency of about 10 kHz), the noise becomes a high noisy auditory sound.

In the recent automotive vehicles, in order to seek more comfort driving, a higher quietness within the vehicle interior is demanded. In accordance with this, the reduction (ideally, removal) of the above-described high frequency noise generated from the miniature electric motor used in the automotive electric equipment is required.

Therefore, all kinds of technology have been proposed in order to reduce the motor noise. One of these approaches is that an elastic member such as a vibration proof rubber is provided in the interior of the miniature electric motor to reduce the vibration to thereby reduce the motor noise.

For example, in the motor 1 shown in FIG. 5, in some cases, the elastic member (not shown) is disposed on the brushes 11 per se or between the brush holder 12 and the housing 2. Thus, since the elastic member absorbs the vibration of the motor 1, the motor noise is reduced to some extent.

However, it is difficult to satisfactorily reduce the motor noise. Also, when the motor is assembled, the work for mounting the elastic member is troublesome and the number of the motor parts becomes increased. As a result, the manufacturing steps of the motor are complicated. Also, unless the elastic member is mounted in a predetermined position with high precision, there are some cases in which the non-uniformity takes place in the extent to reduce the motor noise.

SUMMARY OF THE INVENTION

In order to overcome the above-noted defects, an object of the present invention is to provide a miniature electric motor which is quiet with low noises without the elastic member for the vibration proof.

Exemplifying a miniature electric motor used in the experiments to be described later, it has been found out from the measured results of the noises that a high frequency sound having a frequency of about 10 kHz is generated.

Accordingly, the present inventors assume that a part vibrating at a certain frequency, which is in mutual relation with a frequency of the above-described high frequency noise, will be a source for generating the above-described high frequency noise.

Therefore, the vibrating condition of the cover plate 3 out of the parts of the motor 1 shown in FIG. 5 was measured from the outside of the motor 1. In the experiment, a number (for example, several hundreds or several thousands) of points are set up in a matrix form over the full outer surface of the cover member 3, and the vibration at each point is measured. The vibrating condition in which the cover plate 3 is vibrated is expressed in a three-dimensional manner through computer graphics on the basis of the measured data at the respective points.

Then, it is found that a central portion 13 of the cover plate 3 is vibrated at a maximum magnitude in a direction of a centerline axis CL2 of the motor 1 as indicated by a two-headed arrow E. This is similar to the phenomenon in which, when a drum is hit, its leather is vibrated to generate a sound.

In addition, the frequency of vibration of the cover plate 3 is about 10 kHz. This frequency is substantially the same as the frequency of the high frequency sound generated from the motor 1. This means that there is a mutual relationship between the frequency of vibration of the cover member 3 and the frequency of the noise, and means that the high frequency sound having the frequency, which is substantially the same as the frequency of this vibration, is generated from the cover plate 3 when the cover member 3 is vibrated.

In addition, when the central portion 13 of the cover plate 3 is vibrated, the rotor 6 vibrates in the direction of the centerline axis CL2 and there is fear that adverse affect would be imparted to the motor 1.

Thus, it is clear that a cause of the generation of the high frequency sound generated from the motor 1 is due to the vibration of the cover plate 3. Subsequently, an approach for reducing the vibration of the cover plate 3 is reviewed.

Since the central portion 13 of the cover plate 3 is vibrated at a large magnitude, when the central portion 13 is depressed from the outside of the motor 1 to avoid the vibration of the cover member 3, there is no high frequency sound. However, this is not used directly for the noise countermeasure by the motor per se.

On the other hand, it is effective to press a back side of the central portion 13 of the cover plate 3 from an inside of the motor. However, since the rotary shaft 9 and the bearing portion 8 are disposed inside the central portion 13, it is impossible to press the central portion 13 from the inside of the motor.

Therefore, the present inventors pay their attention to a brush holder fixed to the cover plate, and propose to strongly and forcibly press a portion in the vicinity of the central portion of the cover plate by this brush holder. Thus, it is possible to reduce the vibration of the cover plate thereby to reduce the noise of the motor.

In order to attain the above-noted and other objects, according to the present invention, there is provided a miniature electric motor comprising a housing formed in a bottomed hollow sleeve shape, a cover plate fitted in an opening portion of the housing, a stator fixed to an inner circumferential surface of the housing, a rotor disposed in an interior of the housing, a rotary shaft of the rotor being rotatably supported to one and the other bearing portions mounted on the housing and the cover plate respectively, and a brush holder holding brushes and mounted on the cover plate, the brushes being slidingly engaging with a commutator of the rotor, wherein a first projection is formed in the vicinity of a center of at least one of the brush holder and the cover plate, and the first projection is forcibly pressed at a predetermined pressure against the other of the brush holder and the cover plate.

It is preferable that the first projection is formed on the brush holder having elasticity and is pressed at the predetermined pressure against a back surface of the cover plate with a resilient force of the brush holder.

Preferably, the first projection formed on the brush holder forcibly presses a portion in the vicinity of the center of the back surface of the cover plate with the resilient force of the brush holder at the predetermined pressure, whereby the first projection is somewhat moved toward an interior of the motor, and under this condition the first projection is brought substantially into linear contact with the cover plate.

For example, while the cover plate is vibrated, a magnitude of vibration in a central portion of the cover plate is increased, whereas the first projection presses the portion in the vicinity of the central portion, at which the magnitude of vibration is increased, at the predetermined pressure, whereby the magnitude of vibration of the cover plate is decreased as a whole and it is possible to prevent a vibration of the rotor in a direction of a centerline axis.

It is preferable that the brush holder is fixed to the cover plate in the vicinity of an outer circumferential edge of the brush holder, and an opening portion for arranging the rotor is formed through in the brush holder in a center thereof, the first projection is integrally formed on an outer surface of the brush holder along an inner circumferential edge of the opening portion, and a plurality of slit portions are formed radially from the inner circumferential edge.

Preferably, the plurality of slit portions are arranged uniformly along an overall circumference of the inner circumferential edge to thereby divide the first projection into a plurality of segments, and each divided segment of the first projection is likely to be elastically deformed individually to exhibit a spring effect individually and is brought into pressing contact with the cover plate.

Also, it is preferable that at least one second projection is formed integrally on an end face opposite to an outer surface of the brush holder, and the second projection is forcibly brought into contact with the stator.

According to one aspect of the present invention, the brush holder has the end face on the opposite side to the outer surface on which the first projection is formed, and the end face is a surface which is continuous from an end edge of the outer circumferential surface of the brush holder and which is perpendicular to a centerline axis, and the end face is arranged so as to face one end faces of the pair of stators, respectively.

It is preferable that the second projection projects from the end face of the brush holder in a form of a partially spherical shape.

For example, in the case in which the stators are formed out of relatively soft magnetic material such as a plastic magnet or a rubber magnet, while the second projection is forcibly pressed against one end faces of the stators, the second projection deforms somewhat the stators and somewhat enters the stators, and under this condition the second projection is brought substantially into area contact with the stator.

According to another aspect of the present invention, in the case in which the stators are formed out of hard material, the second projection is brought substantially into point contact with the stator.

Furthermore, at least one third projection is integrally formed on an outer circumferential surface of the brush holder so that the third projection is forcibly pressed against the inner circumferential surface of the housing.

It is preferable that the third projections have elongated shapes extending in parallel with a centerline axis, each outer surface of the third projections forms a partial cylindrical shape, and the third projections are formed along an overall circumstance of the outer circumferential surface so as to project from the outer circumferential surface.

Preferably, the cover plate is fitted in the opening portion of the housing, and the outer circumferential surface of the brush holder is engaged with the inner circumferential surface of the housing, so that the third projections are brought substantially into linear contact with the housing.

Also, in a preferred embodiment, the cover plate is formed integrally out of the same metal as that of the housing or resin material, and the brush holder is formed integrally out of synthetic resin or glass fiber reinforced synthetic resin with insulating property.

It is preferable that a plurality of connecting terminals are mounted on the brush holder, the brushes are electrically connected to the connecting terminals, and end portions of the connecting terminals project outwardly from a surface of the cover plate to be connected to a wiring.

For example, when a predetermined part of the miniature electric motor is vibrated, a mutual relationship between a vibration frequency of the predetermined part and a frequency of a motor noise is identical or proportional relationship with each other.

According to another aspect, with respect to the mutual relationship between the vibration of the cover plate and the noise of the motor, the vibration frequency of the cover plate and the frequency of the generated high frequency sound are substantially identical with each other.

In a specific embodiment, the frequency of vibration, when the cover plate is largely vibrated, is about 10 kHz, whereas the motor noise generated at this time is the noisy high frequency sound with a frequency of about 10 kHz, so that the vibration of the vibration frequency of about 10 kHz is reduced down to thereby reduce the high frequency sound.

As described above, according to the present invention, it is possible to provide a miniature electric motor which is quiet with low noises even if an elastic member for vibration proof is not used.

BRIEF DESCRIPTION OF THE DRAWINGS

In the accompanying drawings:

FIGS. 1 to 4C are views showing one embodiment of the present invention;

FIG. 1 is a cross-sectional view of a miniature electric motor;

FIG. 2 is a perspective view of the motor shown in FIG. 1;

FIG. 4C is a back side view of the brush holder;

FIGS. 6A to 10 show one embodiment, FIG. 6A is an illustration of a measurement condition of vibration of the miniature electric motor and FIG. 6B is an illustration of the measurement condition of the motor noise;

FIG. 7 is a graph showing data of typical vibration of the conventional miniature electric motor;

FIG. 8 is a graph showing other data of vibration of the conventional miniature electric motor;

FIG. 9 is a graph showing data of vibration of the miniature electric motor according to the present invention; and FIG. 10 is a graph showing data of noises of the miniature electric motors according to the present invention and the conventional one.

DESCRIPTION OF THE PREFERRED EMBODIMENTS

An embodiment of the present invention will now be described with reference to FIGS. 1 to 10.

Figure 1:
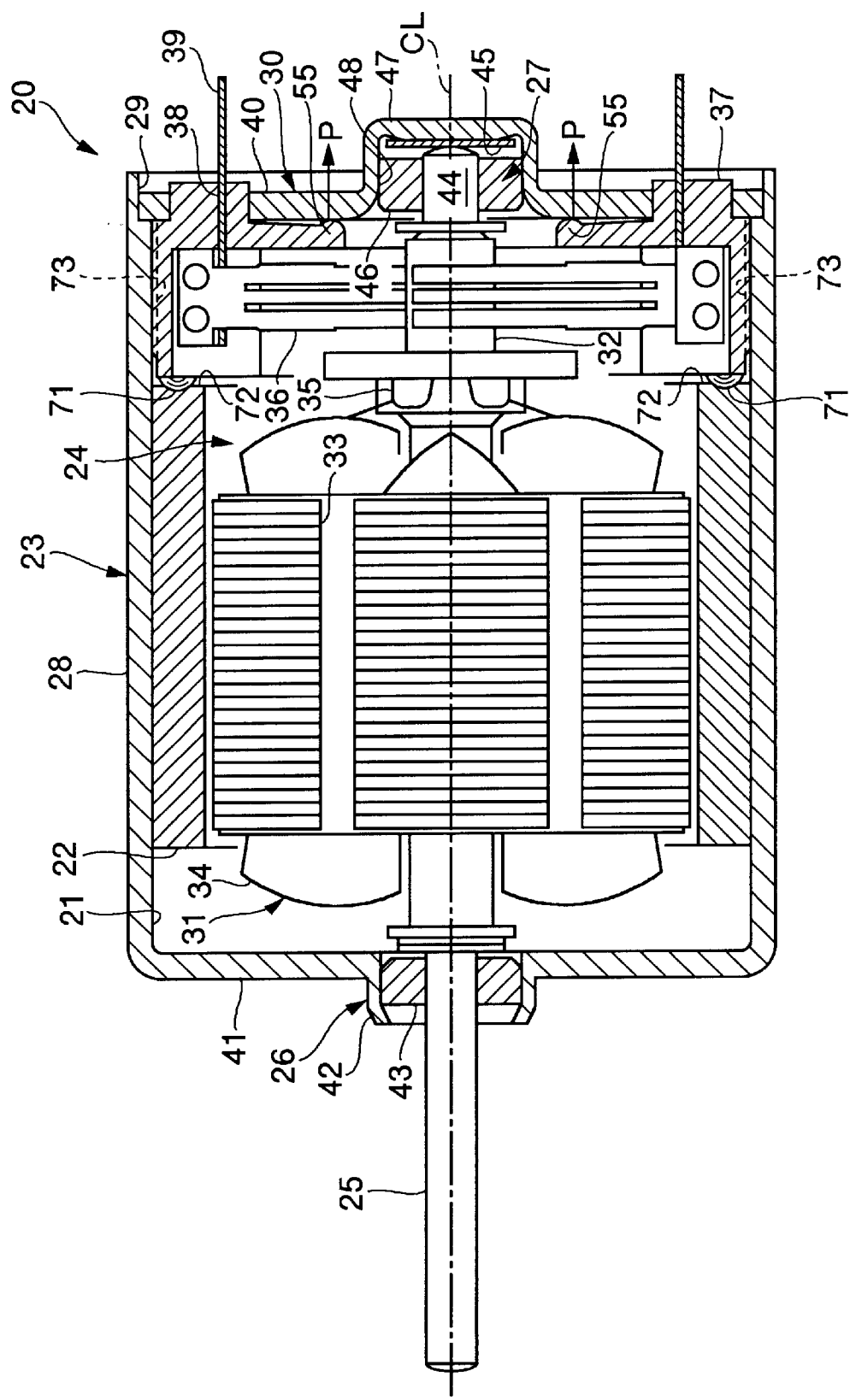
Figure 2:
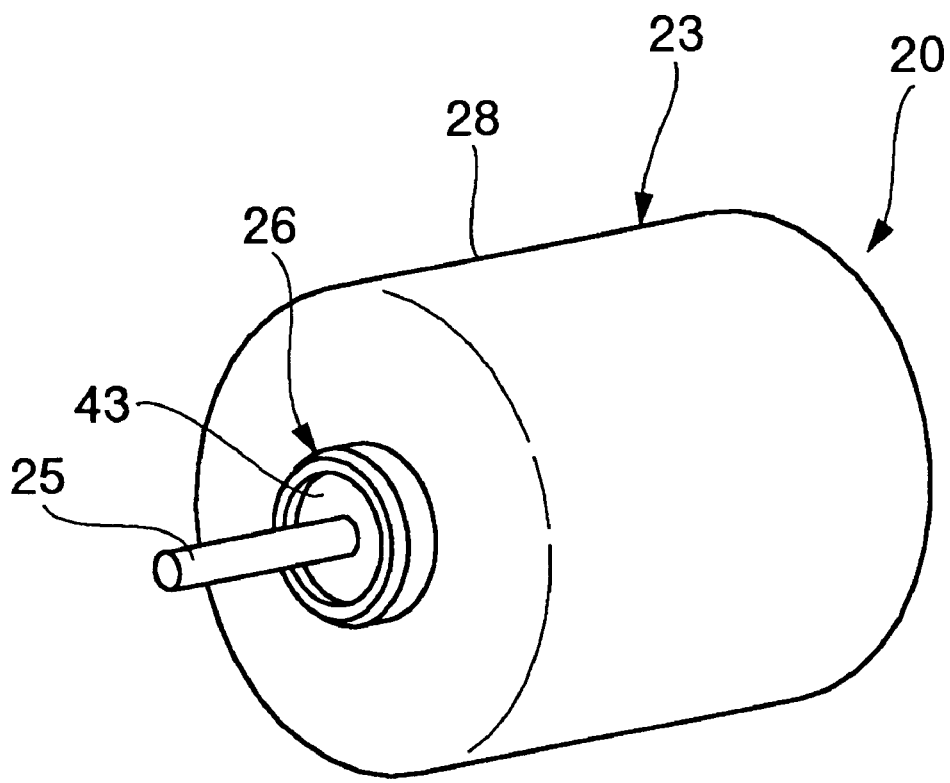

FIGS. 1 to 4C are views showing one embodiment of the present invention. FIG. 1 is a cross-sectional view of a miniature electric motor. FIG. 2 is a perspective view of the motor shown in FIG. 1.

First of all, an overall structure of the miniature electric motor according to the present invention will now be described. As shown in FIGS. 1 and 2, the miniature electric motor (miniature DC motor) 20 is provided with a casing 23 in which a pair of stators are mounted on an inner circumferential surface 21 thereof, and a rotor 24 disposed in the casing 23. A rotary shaft 25 of the rotor 24 is supported rotatably to one bearing portion 26 and the other bearing portion 27 which are provided to the casing 23.

The casing 23 is provided with a housing 28, in which the rotor 24 is disposed and which is formed in a bottomed hollow sleeve shape, and a cover plate 30 fitted in an opening portion 29 of the housing 28.

The housing 28 is integrally formed of a metal made plate member. The cover plate 30 is integrally formed out of the same metal material as that of the housing 28 or resin material.

The bearing portions 26 and 27 are provided on both end portions of the casing 23, respectively. One bearing portion 26 is mounted on the housing 28, whereas the other bearing portion 27 is mounted on the cover plate 30, respectively. The pair of stators 22 are disposed and fixed to an inner circumferential surface 21 of the housing 28 to face each other.

The rotor 24 is disposed in the interior of the housing 28. The rotor 24 is provided with the rotary shaft 25, an armature 31 and a commutator 32. The rotary shaft 25 extends in a direction of a centerline CL which becomes a rotary centerline.

In the armature 31, windings (armature windings) 34 are wound in the form of a coil around an iron core 33 mounted on the rotary shaft 25. The commutator 32 is mounted on the rotary shaft 25 and is electrically connected to the windings 34. The commutator 32 has a plurality of (for example, three) terminals 35 for connecting to the windings 34. A plurality (for example, two pairs) of brushes 36 are in sliding engagement with the commutator 32.

The brushes 36 are held by a brush holder 37 mounted on the cover plate 30. The brush holder 37 is integrally formed out of, for example, insulating material such as insulating synthetic resin or glass fiber reinforced synthetic resin.

A plurality (for example, one pair) of connecting terminals 38 are mounted on the brush holder 37. The brushes 36 are electrically connected to the connecting terminals 38. An end portion 39 of each connecting terminal 38 extends from a surface 40 of the cover plate 30 to be connected to a wiring (not shown).

A cylindrical bearing supporting portion 42 is integrally formed at a central portion of a flat portion 41 of the housing 28. One slide bearing 43 having a sliding surface to constitute one bearing portion 26 is fitly inserted into an inner circumferential surface of the bearing supporting portion 42. The slide bearing 43 rotatably supports an output portion of the rotary shaft 25.

The other bearing portion 27 rotatably supports an opposite output portion of the rotary shaft 25. The bearing portion 27 is provided with a thrust bearing member 45 for supporting an end portion 44 of the rotary shaft 25 in a thrust direction, and the other slide bearing 46 for rotatably supporting the end portion 44 of the rotary shaft 25. The slide bearing 46 is fitly inserted under pressure into an inner circumferential surface 48 of a projection 47 formed on the cover plate 30.

In the motor 20, when the current flows from the connecting terminals 38 through the brushes 36 and the commutator 32 to the windings 34 of the armature 31, a rotational torque is given to the rotor 24 disposed in a magnetic field formed by the pair of stators 22 to cause the rotor 24 to make a rotational motion. As a result, the motor 20 drives an air conditioner (not shown) of an automobile through the output portion of the rotating rotary shaft 25.

The structures of the brush holder 37 and the cover plate 30 will now be described.

Figure 3A:
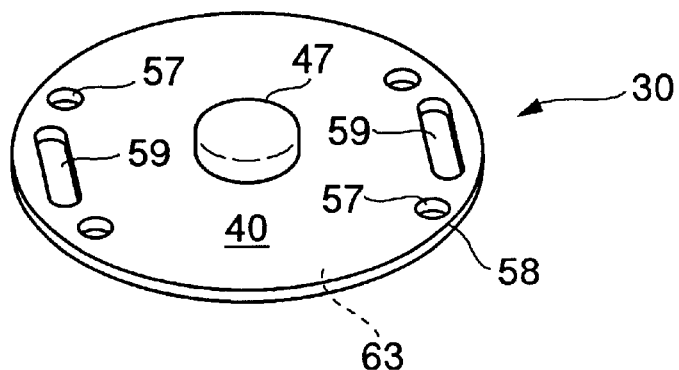
FIG. 3A is a perspective view of a cover plate of the motor shown in FIG. 1, and FIGS. 3B and 3C are perspective views of a brush holder.
Figure 3B:
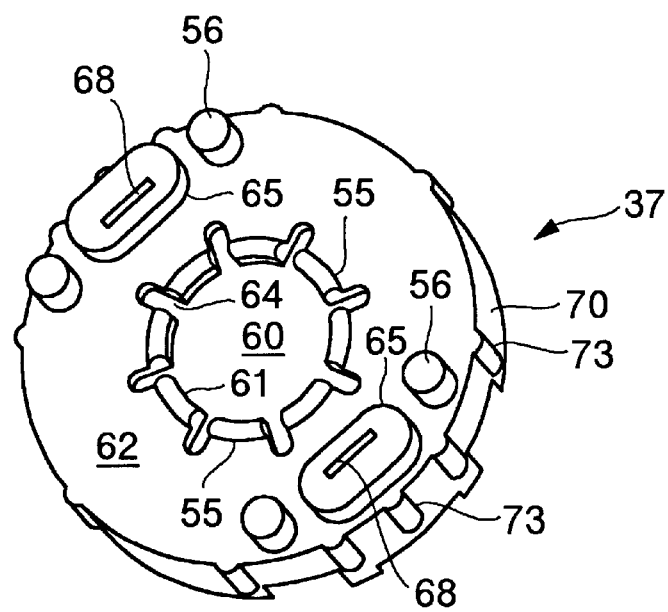
Figure 3C:
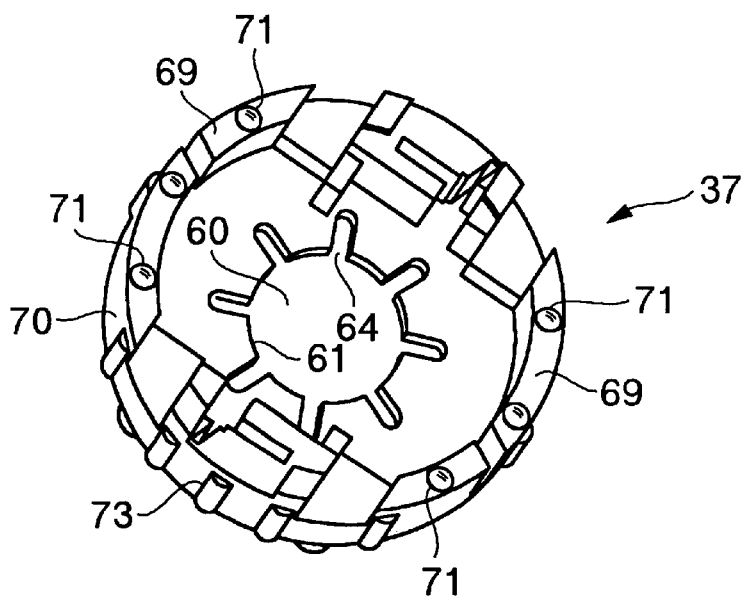
Figure 4A:
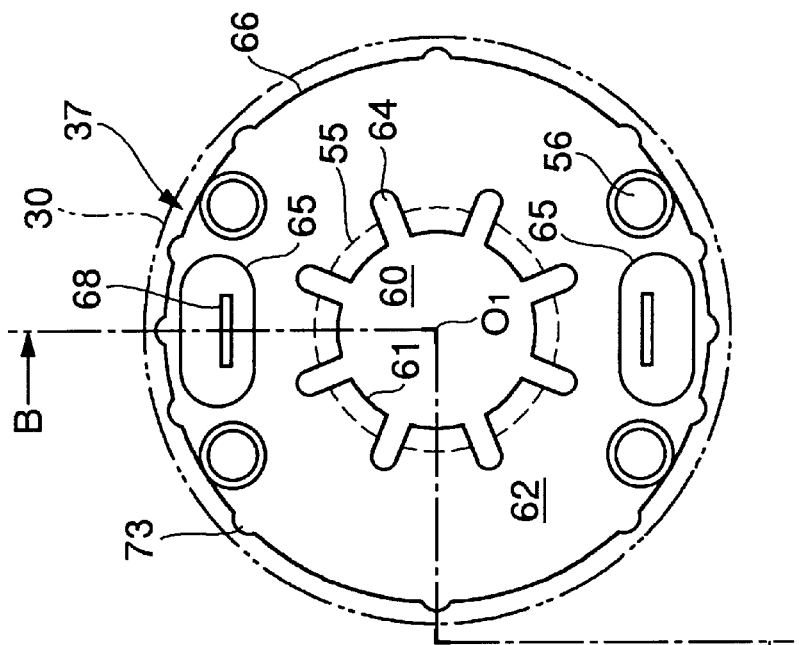
FIG. 4A is a frontal view of the brush holder.
Figure 4B:
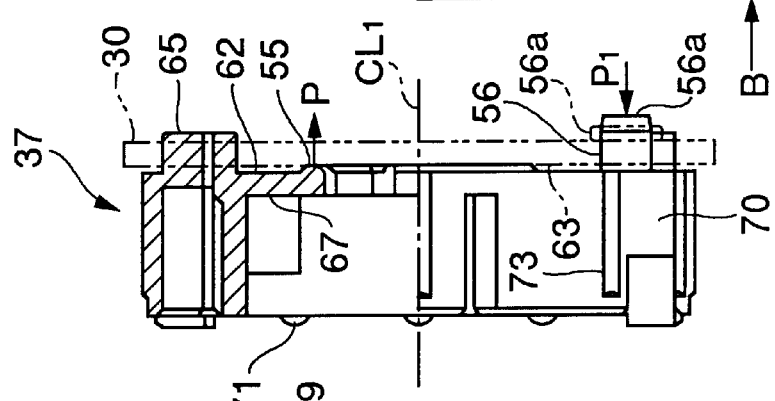
FIG. 4B is half a cross-sectional view taken along a line B—B of FIG. 4A
Figure 4C:
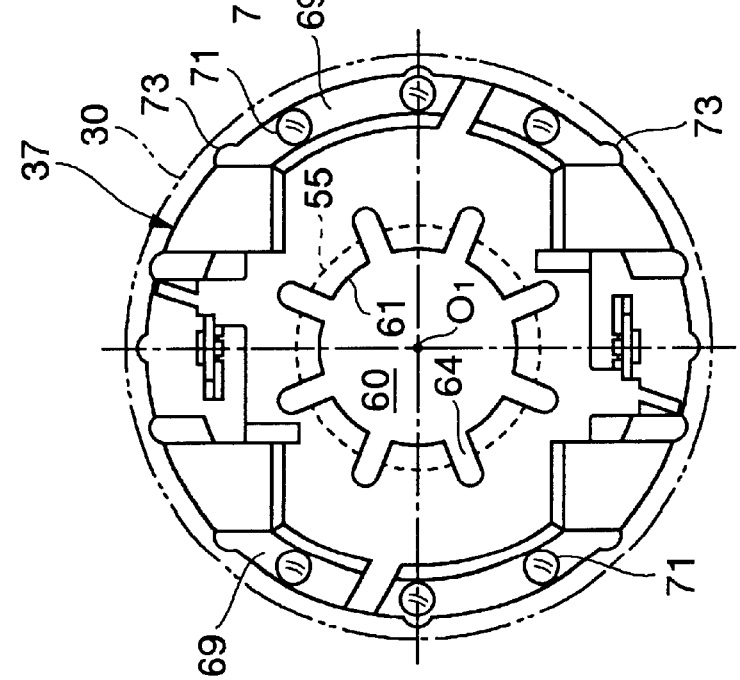

FIG. 3A is a perspective view of the cover plate 30 and FIGS. 3B and 3C are perspective views of the brush holder 37. FIG. 4A is a frontal view of the brush holder 37, FIG. 4B is half a cross-sectional view taken along the line B—B of FIG. 4A, and FIG. 4C is a back side view.

In the miniature electric motor according to the present invention, a first projection is formed in the vicinity of the center of at least one of the brush holder and the cover plate, and the first projection is forcibly pressed at a predetermined pressure P against the other of the brush holder and the cover plate.

Incidentally, in this embodiment, the first projection is formed on the brush holder but it is possible to form the first projection on the cover plate or to form the first projections on both the brush holder and the cover plate.

As shown in FIGS. 1 to 4C, a plurality of (for example, four) through holes 57 are formed in the cover plate 30. The four through holes 57 are arranged in the vicinity of an outer circumferential edge portion 58. A projection 47 is integrally formed in the central portion of the cover plate 30.

A bottomed recess portion for receiving the other bearing portion 27 is formed within the interior of the motor by the projection 47. A plurality (for example, one pair) of elongated oblong holes 59 are formed through in the vicinity of the outer circumferential edge portion 58.

The brush holder 37 has a plurality of (for example, four) retainer members 56 disposed in the vicinity of an outer peripheral edge 66 of the brush holder 37. The brush holder 37 is fixed to the cover plate 30 in the vicinity of the outer peripheral edge 66 by plastically deforming the retainer members 56. The brush holder 37 has a slight elasticity to make it possible to exhibit the predetermined large pressure P due to its elastic force.

An opening portion 60 for arranging the rotor 24 is formed through in the brush holder 37 at a center 01 thereof. The opening portion 60 has a circular shape but may have a polygonal shape such as a triangular shape, a rectangular shape, a hexagonal shape or the like, or any other desired shape.

A first projection 55 is formed integrally along an inner circumferential edge 61 of the opening portion 60. The first projection 55 is formed on an outer surface 62 (surface which face the cover plate 30) of the brush holder 37. The first projection 55 is formed in the vicinity of the center 01 of the brush holder 37. Then, the first projection 55 is forcibly pressed at a predetermined pressure P against a back surface 63 of the cover plate 30.

A plurality of (for example, eight) radial slit portions 64 are formed radially from the inner circumferential edge 61 of the opening portion 60 on the brush holder 37. The eight slit portions 64 are formed in U-shapes and are uniformly arranged along the overall circumference of the inner circumferential edge 61. Since the eight slit portions 64 are formed, the first projection 55 is divided into eight segments, and each segment of the first projection 55 may exhibit a spring effect individually.

A plurality of (for example, four in total) retainer members 56 and a plurality (for example, one pair) of portions 65 for supporting the connecting terminals 38 are formed integrally in the vicinity of the outer circumferential edge 66 of the brush holder 37 on the outer surface 62 of the brush holder 37. The retainer members 56 and the supporting portions 65 for the connecting terminals 38 project outwardly from the outer surface 62.

The retainer members 56 are formed in cylindrical shapes so as to be fitted into the through holes 57 of the cover plate 30. The supporting portions 65 for the connecting terminals 38 are formed in oblong shapes so as to be fitted into the elongated holes 59 of the cover plate 30. The supporting portions 65 are integrally formed to also project toward the inner surface 67 of the brush holder 37. The connecting terminals 38 are fitly inserted under pressure and are held in holding holes 68 formed in the supporting portions 65.

The brush holder 37 has end faces 69 on the opposite side to the outer surface 62 on which the first projection 55 is formed. The end faces 69 are surfaces, which are continuous from the end edge of the outer circumferential surface 70 and are perpendicular to a centerline axis CL1. The end faces 69 are arranged so as to face each of the one end face 72 of the pair of stators 22.

A plurality of (for example, six) second projections 71 are formed integrally to project on the end faces 69. Three second projections 71 are formed on the one end face 69 and the other end face 69, respectively. The second projections 71 project like a partially spherical shape so as to be forcibly pressed against the stators 22.

A plurality of (for example, twelve) third projections 73 are integrally formed on the outer circumferential surface 70 of the brush holder 37. The third projections 73 are formed along the overall circumference of the outer circumferential surface 70 so that each outer surface of the third projection 73 forms a partial cylindrical shape to project from the outer circumferential surface 70. The third projections 73 have elongated shapes extending in parallel with the centerline axis CL1 so as to be forcibly pressed against the inner circumferential surface 21 of the housing 28.

Incidentally, one or both of the second and third projections 71 and 73 may be omitted.

The steps for assembling the motor 20 will now be described.

In the case in which the brush holder 37 is to be fixed to the cover plate 30, the brushes 36 and the connecting terminals 38 are mounted on the brush holder 37. The brushes 36 are electrically connected to the connecting terminals 38. The thrust bearing member 45 and the slide bearing 46 are mounted on the inside of the projection 47 of the cover plate 30.

Then, each retainer member 56 is inserted into the associated through hole 57 and each supporting portion 65 for the connecting terminal 38 is inserted into the associated elongated hole 59. When the brush holder 37 is brought into contact with the back surface 63 of the cover plate 30, a head portion 56a of each retainer member 56 projects outwardly from the outer surface 40 of the cover plate 30.

Under this condition, the cover plate 30 is pressed against the brush holder 37 with a strong force by a jig or the like. At the same time, the pressure P1 is applied to the retainer members 56 by another jig or the like, so that their head portions 56a are crashed.

Then, the head portions 56a are plastically deformed to expand laterally so that the portion in the vicinity of the outer circumferential edge of the brush holder 37 is brought into intimate contact with the cover plate 30 and is fixed to the cover plate 30. Thus, the cover plate 30 and the brush holder 37 may be firmly fixed in the vicinity of the outer circumferential edge with each other by the four retainer members 56. This is one of the necessary conditions to reduce the vibration of the cover plate 30. As a result, the portion in the vicinity of the central portion of the cover plate 30 is kept to be normally pressed at the predetermined pressure P by the first projection 55 of the brush holder 37.

More specifically, the first projection 55 of the brush holder 37 forcibly presses the portion in the vicinity of the center 01 of the back surface 63 of the cover plate 30 at the predetermined pressure P with a resilient force of the brush holder 37. Then, the brush holder 37 is plastically deformed so that the first projection 55 is somewhat moved toward the interior of the motor. Under this condition, the first projection 55 is brought substantially into linear contact with the cover plate 30.

On the other hand, with respect to the housing 28, the slide bearing 43 is mounted in the interior of the bearing supporting portion 42, and the pair of stators 22 are fixed on the predetermined positions of the inner circumferential surface 21 of the pair of stators 22. Subsequently, the rotor 24 is assembled into the interior of the housing 28. At this time, the rotary shaft 25 is inserted into the one slide bearing 43 and the armature 31 is received in the interior of the housing 28.

Subsequently, the brush holder 37 and the cover plate 30 which are fixed together are mounted in the housing 28. In this case, the brushes 36 are engaged with the commutator 32 and the end portion 44 of the rotary shaft 25 is inserted into the other slide bearing 46. Simultaneously therewith, the cover plate 30 is fitted in the opening portion 29 of the housing 28.

When the cover plate 30 is fitted in the opening portion 29, the outer circumferential surface 70 of the brush holder 37 is engaged with the inner circumferential surface 21 of the housing 28. Then, the third projections 73 formed on the outer circumferential surface 70 are forcibly pressed against the inner circumferential surface 21 of the housing 28. Under this condition, the third projections 73 are brought substantially into linear contact with the housing 28.

On the other hand, the second projections 71 formed on the end faces 69 of the brush holder 37 are forcibly pressed against the one end face 72 of the stators 22. For example, in some cases, the stators 22 are formed out of relatively soft magnetic material such as a rubber magnet or a plastic magnet. In such cases, the second projections 71 somewhat deform the stators 22 and somewhat enter the stators 22. Under this condition, the second projections 71 are brought substantially into area contact with the stators 22. Incidentally, in the case in which the stators 22 are formed out of a hard material, the second projections 71 are brought substantially into point contact with the stators 22.

Thus, an assembling work of the motor 20 has been completed.

In the thus constructed motor 20, when the rotor 24 is rotated, the sliding contact between the commutator 32 and the brushes 36 causes the brushes 36 to be vibrated. Then, the brush holder 37 is vibrated, and this vibration of the brush holder 37 is transmitted from the brush holder 37 to the cover plate 30.

However, the portion in the vicinity of the central portion of the cover plate 30 is strongly and forcibly pressed at the predetermined pressure P by the first projection 55 of the brush holder 37. Accordingly, the cover plate 30 is hardly vibrated.

In addition, since the second projections 71 are forcibly pressed against the stators 22, the vibration of the brush holder 37 is transmitted to and absorbed by the stators 22 having a large mass. Furthermore, since the third projections 73 are forcibly pressed against the inner circumferential surface 21 of the housing 28, the vibration of the brush holder 37 is positively transmitted to the housing 28. As a result, the vibration of the brush holder 37 is absorbed by the housing 28 having a large mass. Thus, since the vibration of the brush holder 37 is absorbed by the stators 22 and the housing 28, the vibration transmitted to the cover plate 30 may further be reduced.

As a result, if the elastic material for the vibration proof is not used in the motor, it is possible to reduce the noise generated by the vibration of the cover plate 30 and to keep the motor 20 quiet.

The first projection 55 is divided into eight segments by the slit portions 64. Each divided segment of the first projection 55 is likely to be elastically deformed individually. Accordingly, each divided segment of the first projection 55 exhibits the spring effect to be brought into pressing contact with the cover plate 30 individually. Accordingly, if an error is involved in the manufacture dimension of the brush holder 37 to some extent, it is possible to bring the first projection 55 into positive abutment with the cover plate 30.

According to the present invention, the conventional vibration proof elastic member may be dispensed with. Therefore, it is possible to reduce the number of the parts of the motor 20, to simplify the manufacturing steps, and to reduce the cost for manufacturing the motor 20. Also, the workability for assembling the motor 20 may be enhanced.

Also, in some cases, since the elastic member which has been conventionally used is soft, it is difficult to machine the elastic member with high precision, so that non-uniformity in motor noise occurs. In contrast, according to the present invention, since it is possible to machine the brush holder 37 with high precision, it is possible to stably reduce the vibration of the motor 20 to normally reduce the motor noise so as not to have non-uniformity.

Figure 5:
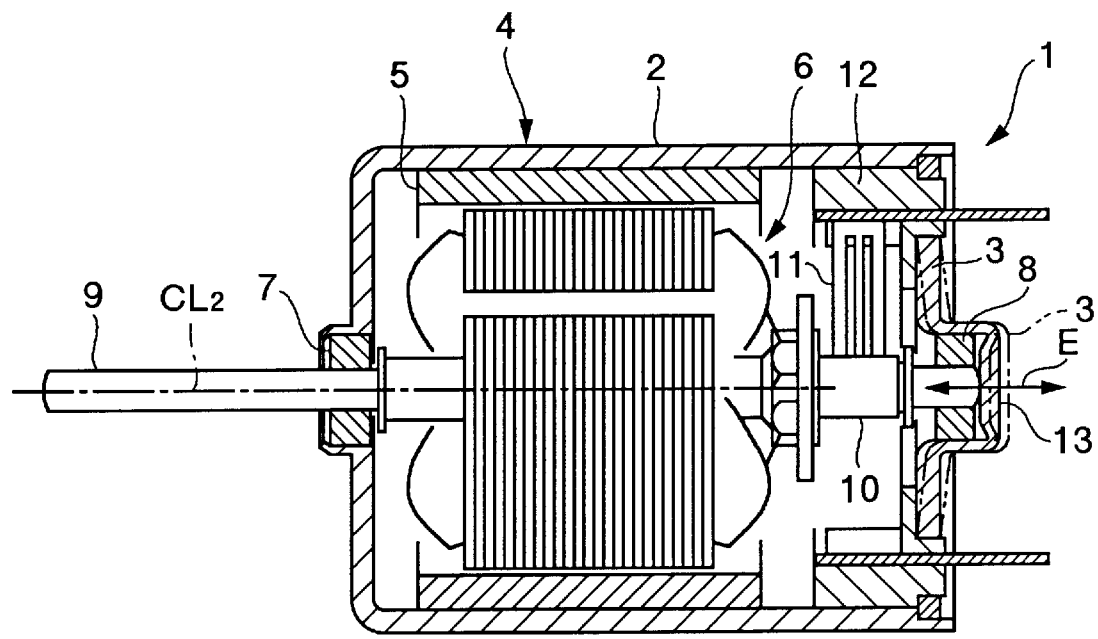
FIG. 5 is a cross-sectional view of a conventional miniature electric motor.

In the motor 20 according to the present invention, it is sufficient to effect the modification to the design of the brush holder 37 with the above-described structure, as it is apparent from the comparison with the conventional motor shown in FIG. 5. Then, it is possible to use the same parts as those of the conventional motor, for other parts.

Namely, only by changing the manufacturing steps for the brush holder 37, it is possible to manufacture the motor 20 according to the present invention while using the line for manufacturing the conventional motor shown in FIG. 5 without any change. Accordingly, only by changing the manufacturing line with a slight modification, it is possible to manufacture the motor 20 according to the present invention with ease and in low cost.

The housing 28 and the cover plate 30 are formed so as to have such a dimension in which the coaxiality therebetween is kept at a high precision. However, the precision of the coaxiality of the brush holder 37 is relatively low in comparison with these components 28 and 30. Accordingly, there is a possibility for generating a gap between the inner circumferential surface 21 of the housing 28 and the outer circumferential surface 70 of the brush holder 37.

If there is the gap, the vibration of the brush holder 37 is not sufficiently transmitted to the housing 28. As a result, if the vibration of the brush holder 37 is not sufficiently absorbed by the housing 28 and is transmitted to the cover plate 30, the cover plate 30 is largely vibrated so that the noise is also remarkable.

In contrast, according to the present invention, since the third projections 73 are formed on the outer circumferential surface 70 of the brush holder 37, the third projections 73 are normally pressed against the inner circumferential surface 21 of the housing 28.

Accordingly, the vibration of the brush holder 37 is normally sufficiently transmitted to the housing 28 through the third projections 73 and is absorbed by the housing 28. Thus, it is possible to reduce the vibration transmitted to the cover plate 30. Also, since the precision of coaxiality of the brush holder 37 is not so much taken, the work for mounting the brush holder 37 to the cover plate 30 and the work for manufacturing the brush holder 37 are simplified.

While the cover plate 30 is vibrated, the magnitude of the vibration in the central portion of the cover plate 30 is increased. The portion in the vicinity of the central portion with such large vibrations is pressed at the predetermined pressure P by the first projection 55.

Accordingly, the magnitude of the vibration of the cover plate 30 is decreased as a whole. Thus, the noise generated by the vibration of the cover plate 30 is reduced. This is the same phenomenon in which the sound is minimized or obviated by pressing the central portion of the leather of the drum.

Also, since the vibration of the central portion of the cover plate 30 may be reduced, it is possible to prevent the vibration of the rotor 24 in the direction of the centerline axis CL thereby to avoid the adverse affect to the motor 20.

EXAMPLE

One example of the present invention will now be described.

In this example, an experiment was conducted with respect to a conventional miniature electric motor (without any elastic member) M1 and another conventional miniature electric motor (with elastic members) M2 and a miniature electric motor M according to the present invention. The conventional motors M1 and M2 have substantially the same structure as that of the motor shown in FIG. 5. An elastic member for vibration proof is not used in the motor M1. In the motor M2, the gap portions (not shown) are formed at diametrically opposite positions between the brush holder and the housing, and elastic members (not shown) for vibration proof are inserted in these gap portions.

Figure 6A:
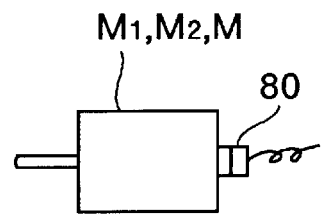
Figure 6B:
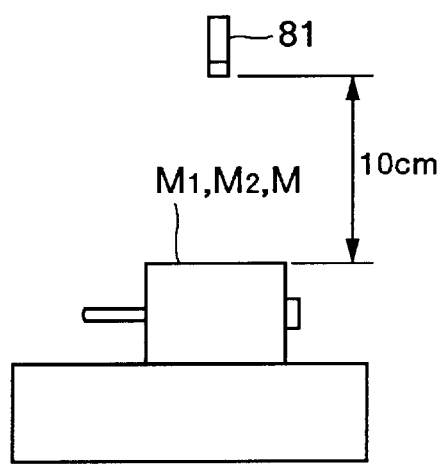

The sizes and the operational conditions of the motors M1, M2 and M used in this experiment are as follows:

Casing diameter: 24 mm
Casing length: 31 mm
Rotary shaft diameter: 2 mm
Revolving speed: about 3,000 min$^{-1}$
Output torque: $9.8 \times 10^{-3}$ N·m (100 gf·cm)
Voltage: 12V FIGS. 6A to 10 show the example. FIGS. 6A and 6B show the measurement condition of the vibration of the motors M1, M2 and M, and the measurement condition of the motor noise, respectively.

Figure 7:
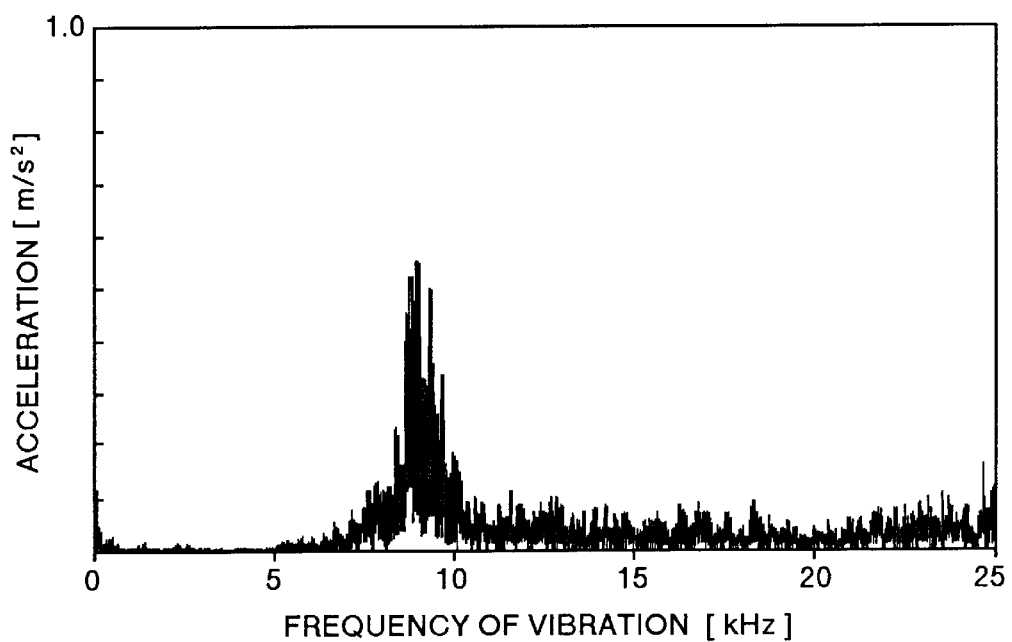
Figure 8:
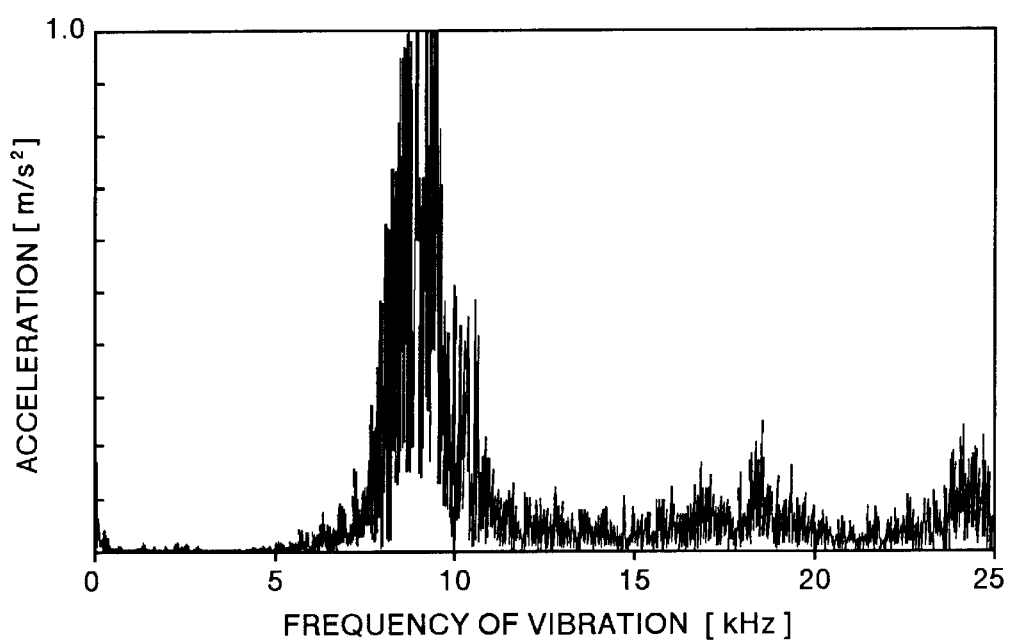
Figure 9:
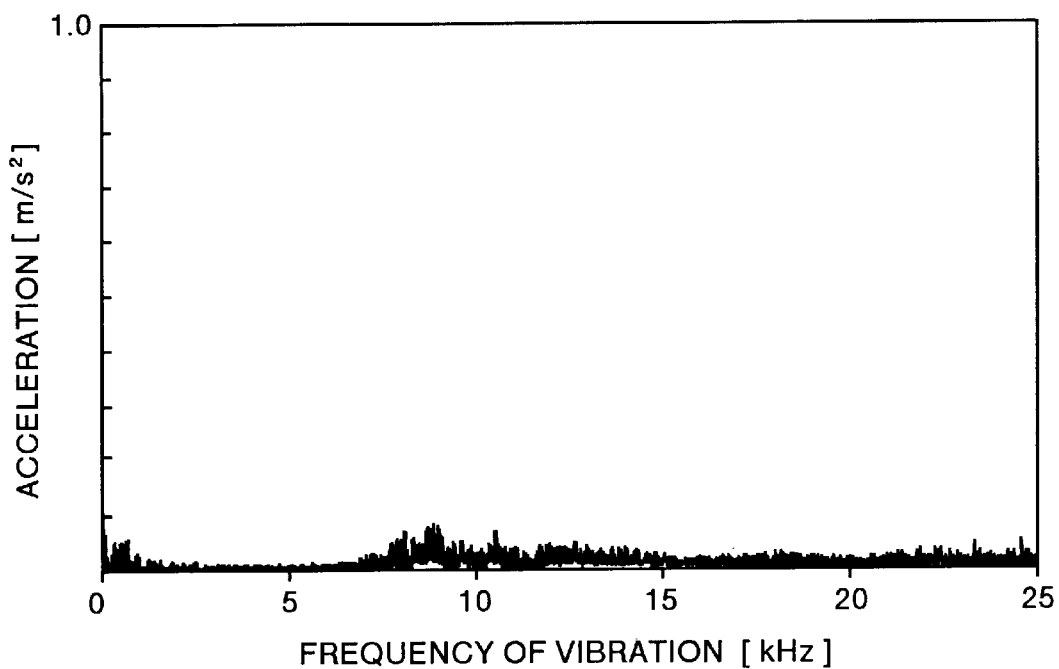

FIG. 7 is a graph showing data of typical vibration of the conventional motor M1. FIG. 8 is a graph showing other data of vibration of the conventional motor M1. FIG. 9 is a graph showing data of vibration of the motor M according to the present invention.

As shown in FIG. 6A, an acceleration pickup 80 is mounted on a projection which corresponds to the central portion of the cover plate of the miniature motors. The vibrations of the motors M1, M2 and M are measured. Also, as shown in FIG. 6B, a noise meter 81 is arranged at a position away by 10cm upwardly from a central portion of a side surface of the casing of the motor. Noises of the motors M1, M2 and M are measured.

In the graphs shown in FIGS. 7 to 9, the abscissa indicates the frequency of vibration and the ordinate indicates the acceleration. As shown in FIG. 7, in the conventional motor M1, the vibration with frequency of about 10 kHz is at maximum. Since this gives the like result as in the other experiment conducted for another miniature electric motor of the like type, it is understood that this is the typical vibration. At this time, the noisy and high frequency sound is generated from the motor M1.

As shown in FIG. 8, even in the same type motor M1, there is a case in which the vibration with a frequency of about 10 kHz is extremely high. When such a vibration is generated, the high frequency sound is especially large.

In contrast, in the motor M according to the present invention, as shown in FIG. 9, the vibration with a frequency of about 10 kHz is reduced and the vibration is small over the entire range of the vibration frequency.

Figure 10:
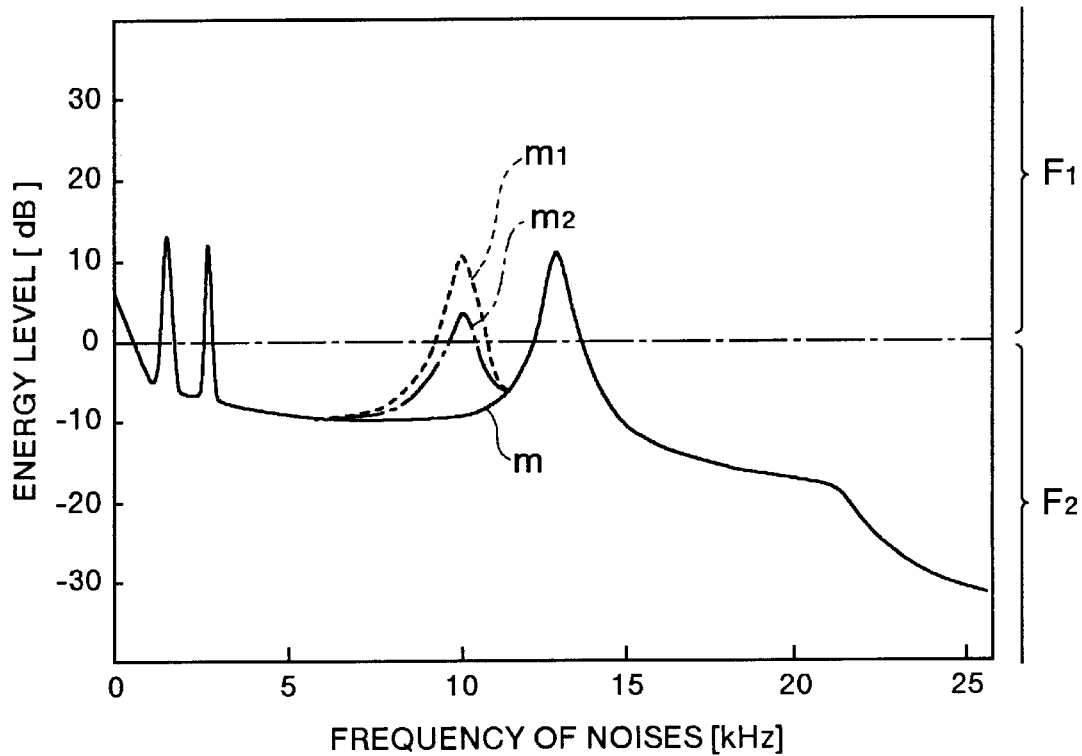

FIG. 10 is a graph showing data of noises in the conventional motors M1 and M2 and the motor M according to the present invention. The abscissa indicates the frequency of noises and the ordinate shows the energy level. Curved lines m1, m2 and m indicate the average values of the data obtained by measuring the noises hundred times for each of the motors M1, M2 and M.

In the graph of FIG. 10, a range F1 above the zero in terms of the energy level means the auditory range in which the human ears may hear the sound, and a range F2 below zero means the human ears cannot hear the sound.

In case of the conventional motors M1 and M2, the high frequency sound with a frequency of about 10 kHz is heard by the human ears as shown in the curved line (dotted line) m1 and the curved line (chain line) m2, respectively. In particular, in the motor M1 without the elastic member, the noisy and high frequency sound is remarkable as indicated by the curved line m1.

In contrast, in the motor M according to the present invention, the high frequency sound with a frequency of about 10 kHz is reduced as shown in the curved line (solid line) m. This sound with the frequency of about 10 kHz is reduced by about 10 dB to 20 dB (decibel) in terms of the energy level in comparison with the conventional cases. In addition, since the energy level of this high frequency sound is below zero, the sound is not heard by the human ears. Incidentally, although the high frequency sound with a frequency of about 13 kHz is generated, this sound is not heard by the human ears and is negligible.

The measured results of the sound pressure level in decibels with respect to the motors M1, M2 and M are shown as follows:

Conventional motor (without elastic members) M1: 27.2 dB
Conventional motor (with elastic members) M2: 25.2 dB
Motor M according to the invention: 24.3 dB As is apparent from FIGS. 7 to 10, the vibration frequency is about 10 kHz when the cover plate is largely vibrated, whereas the noise generated at this time is the high frequency sound with a frequency of about 10 kHz, and this high frequency sound causes the noisy sound.

Thus, since the frequency of strong vibration of the cover plate and the frequency of the generated high frequency sound are substantially identical with each other, it is understood that there is a mutual relationship between the vibration and the noise. Accordingly, when the vibration with a frequency of about 10 kHz is reduced as shown in FIG. 9, it is possible to reduce the high frequency sound as in the motor M according to the present invention indicated by the curved line m of FIG. 10. In this motor M, since the high frequency sound is reduced down to the non-auditory range in which the sound cannot be heard by the human ears. This is substantially the same as the removal of the sound.

Incidentally, the first to third projections 55, 71 and 73 may be formed in other shapes.

Also, when the predetermined part (the cover plate in this case) of the miniature electric motor, the mutual relationship between the vibration frequency of the predetermined part and the frequency of the motor noise is identical (including substantially identical) relationship but this relationship may be modified in proportional relationship or any other function.

Incidentally, the same reference numerals used in the drawings are used to indicate the like or same members or components.

Various details of the invention may be changed without departing from the scope of the invention. Further, the foregoing description of the embodiments according to the present invention is provided for the purpose of illustration only, and not for the purpose of limiting the invention as defined by the appended claims and their equivalents.

What is claimed is:

1. A miniature electric motor comprising a housing formed in a bottomed hollow sleeve shape, a cover plate fitted in an opening portion of said housing, a stator fixed to an inner circumferential surface of said housing, a rotor disposed in an interior of said housing, a rotary shaft of said rotor being rotatably supported to one and the other bearing portions mounted on said housing and said cover plate respectively, and a brush holder holding brushes and mounted on said cover plate, said brushes being slidingly engaging with a commutator of said rotor, wherein a first projection is formed on and in the vicinity of a center of at least one of said brush holder and said cover plate, and said first projection is forcibly pressed at a predetermined pressure against the other of said brush holder and said cover plate.

2. The miniature electric motor according to claim 1, wherein said first projection is formed on said brush holder having elasticity and is pressed at the predetermined pressure against a back surface of said cover plate with a resilient force of said brush holder.

3. The miniature electric motor according to claim 2, wherein said first projection formed on said brush holder forcibly presses a portion in the vicinity of the center of the back surface of said cover plate with the resilient force of said brush holder at the predetermined pressure, whereby said first projection is somewhat moved toward an interior of said motor, and under this condition said first projection is brought substantially into linear contact with said cover plate.

4. The miniature electric motor according to claim 2, wherein while said cover plate is vibrated, a magnitude of vibration in a central portion of said cover plate is increased, whereas said first projection presses the portion in the vicinity of the central portion, at which the magnitude of vibration is increased, at the predetermined pressure, whereby the magnitude of vibration of said cover plate is decreased as a whole and it is possible to prevent a vibration of said rotor in a direction of a centerline axis.

5. The miniature electric motor according to claim 1, wherein said brush holder is fixed to said cover plate in the vicinity of an outer circumferential edge of said brush holder, and an opening portion for arranging said rotor is formed through in said brush holder in a center thereof, said first projection is integrally formed on an outer surface of said brush holder along an inner circumferential edge of the opening portion, and a plurality of slit portions are formed radially from the inner circumferential edge.

6. The miniature electric motor according to claim 5, wherein said plurality of slit portions are arranged uniformly along an overall circumference of the inner circumferential edge to thereby divide said first projection into a plurality of segments, and each divided segment of said first projection is likely to be elastically deformed individually to exhibit a spring effect individually and is brought into pressing contact with said cover plate.

7. The miniature electric motor according to claim 1, wherein at least one second projection is formed integrally on an end face opposite to an outer surface of said brush holder, and said second projection is forcibly brought into contact with said stator.

8. The miniature electric motor according to claim 7, wherein said brush holder has the end face on the opposite side to the outer surface on which said first projection is formed, and the end face is a surface which is continuous from an end edge of the outer circumferential surface of said brush holder and which is perpendicular to a centerline axis, and the end face is arranged so as to face one end faces of said pair of stators, respectively.

9. The miniature electric motor according to claim 8, wherein said second projection projects from the end face of said brush holder in a form of a partially spherical shape.

10. The miniature electric motor according to claim 9, wherein in the case in which said stators are formed out of relatively soft magnetic material such as a plastic magnet or a rubber magnet, while said second projection is forcibly pressed against one end faces of said stators, said second projection deforms somewhat said stators and somewhat enters said stators, and under this condition said second projection is brought substantially into area contact with said stator.

11. The miniature electric motor according to claim 9, wherein in the case in which said stators are formed out of hard material, said second projection is brought substantially into point contact with said stator.

12. The miniature electric motor according to claim 1, wherein at least one third projection is integrally formed on an outer circumferential surface of said brush holder so that said third projection is forcibly pressed against the inner circumferential surface of said housing.

13. The miniature electric motor according to claim 12, wherein said third projections have elongated shapes extending in parallel with a centerline axis, each outer surface of said third projections forms a partial cylindrical shape, and said third projections are formed along an overall circumstance of the outer circumferential surface so as to project from the outer circumferential surface.

14. The miniature electric motor according to claim 13, wherein said cover plate is fitted in the opening portion of said housing, and the outer circumferential surface of said brush holder is engaged with the inner circumferential surface of said housing, so that said third projections are brought substantially into linear contact with said housing.

15. The miniature electric motor according to claim 1, wherein said cover plate is formed integrally out of the same metal as that of said housing or resin material, and said brush holder is formed integrally out of synthetic resin or glass fiber reinforced synthetic resin with insulating property.

16. The miniature electric motor according to claim 1, wherein a plurality of connecting terminals are mounted on said brush holder, said brushes are electrically connected to the connecting terminals, and end portions of the connecting terminals project outwardly from a surface of said cover plate to be connected to a wiring.

17. The miniature electric motor according to claim 1, wherein when a predetermined part of said miniature electric motor is vibrated, a mutual relationship between a vibration frequency of said predetermined part and a frequency of a motor noise is identical or proportional relationship with each other.

18. The miniature electric motor according to claim 17, wherein with respect to the mutual relationship between the vibration of said cover plate and the noise of said motor, the vibration frequency of said cover plate and the frequency of the generated high frequency sound of said motor are substantially identical with each other.

19. The miniature electric motor according to claim 18, wherein the frequency of vibration, when said cover plate is largely vibrated, is about 10 kHz, whereas the motor noise generated at this time is the noisy high frequency sound with a frequency of about 10 kHz, so that the vibration of the vibration frequency of about 10 kHz is reduced down to thereby reduce the high frequency sound.

* * * * *